March 4, 1969 S. M. STONE 3,431,418

ELECTRO-OPTIC MODULATOR

Filed Feb. 26, 1965

INVENTOR
SAMUEL M. STONE

BY
*R. J. Frank*
ATTORNEY

United States Patent Office 3,431,418
Patented Mar. 4, 1969

3,431,418
ELECTRO-OPTIC MODULATOR
Samuel M. Stone, Great Neck, N.Y., assignor to General Telephone and Electronics Laboratories, Inc., a corporation of Delaware
Filed Feb. 26, 1965, Ser. No. 435,532
U.S. Cl. 250—199                    8 Claims
Int. Cl. H04b 9/00

ABSTRACT OF THE DISCLOSURE

A standing-wave light modulator employing a plurality of crystals which exhibit the longitudinal electro-optic effect is described. The crystals are adjacently positioned and aligned to form a multicrystal structure having a common optic axis. The multicrystal structure is contained in a resonant cavity having no axial variation in electric field. The individual crystals in the structure are rotated about the common optic axis so that the $a$ and $b$ crystallographic axes of a crystal are rotated 90 degrees with respect to the corresponding axes of adjacent crystals to provide an increased index of modulation.

---

This invention relates to an electro-optic modulator.

The increasing interest in optical communication systems wherein a beam of light is used as the carrier for transmitted information has resulted in the need for effective and efficient light modulators. It has been found that modulation of a light beam may be attained through the use of devices employing an electro-optic crystal. An electro-optic crystal exhibits induced birefringence when placed in an electric field and is characterized by the fact that the velocity of light passing therethrough varies with the direction of polarization of the light.

An electro-optic crystal can be described in terms of three coordinate axes, hereinafter referred to as the $a$, $b$ and $c$ crystallographic axes. The $c$ axis of the crystal is termed the optic axis along which the light beam is directed, with the $a$ and $b$ axes located at right angles thereto and to each other. The axes of induced birefringence of a crystal exhibiting a longitudinal electro-optic effect are perpendicular and for potassium dihydrogen phosphate (KDP) and its isomorphs make an angle of 45 degrees with the $a$ and $b$ crystallographic axes.

The application to the crystal of a beam of plane polarized light having a direction of polarization between the axes of induced birefrigence may be considered as the application of two component light beams each corresponding to an axis of induced birefringence. By applying an electric field to the crystal, the velocities of each component are different.

This variation in velocity is a function of the strength of the applied field and the electro-optic coefficient of the crystal and results in the optical phase retardation of one component with respect to the other. The light emerging from the electro-optic crystal is elliptically polarized with the magnitude of the axes of the ellipse being determined by the strength of the applied electric field. Thus the light beam is polarization modulated and may be converted into amplitude or intensity modulated light by the use of the combination of a quarter-wave plate and a linear polarizer.

In addition, when the direction of polarization of the light beam coincides with one of the axes of induced birefringence, the electro-optic effect varies the velocity of the beam in accordance with the applied field. This produces phase modulated light which can then be converted to intensity modulated light by using an optical discriminator. The optical discriminators presently employed split the beam into two components, delay one component 180 degrees and then recombine them to form intensity modulated light.

In applications utilizing phase modulation, the index of modulation, which is the ratio of the maximum frequency deviation to the modulating frequency, is determined by the variation in velocity of light having a direction of polarization parallel to one of the axes of induced birefringence and the optical path length of the crystal. However, for intensity modulation wherein the modulator is used with a quarter-wave plate and a linear polarizer, the index of modulation, which is the ratio of the difference between the maximum modulated intensity and the unmodulated intensity to the unmodulated light intensity, is determined by the difference in the velocity between two components of light each of which corresponds to an axis of induced birefringence and the optical path length of the crystal. This difference in velocity results in the relative optical phase retardation of the light beam components.

The maximum index of modulation attainable for a particular modulator operating at a given input power is found to be limited by the relation of the length of the crystal to the period of the modulating signal. This limitation arises from the fact that the variation in velocity and the phase retardation between the aforementioned components is reversed when the polarity of the applied field reverses. Therefore, the maximum index of modulation is reached when the light transit time through the crystal is equal to one-half of the period of the modulating frequency. If the crystal exceeds this length or additional crystals so oriented are used in a serial manner, the reversal of the electric field causes the effective optical phase retardation to be reduced.

Electro-optic modulators presently utilizing the longitudinal electro-optic effect employ a single one-half period crystal mounted in a resonant cavity with the electric field therein substantially aligned with and having a constant phase along the optic axis of the crystal. In addition to the above discussed limitation on the depth of modulation, the power in the cavity is found to heat the crystal which results in a reduction of the electro-optic coefficient of the crystal. Also, the increase in temperature varies the dielectric constant of the crystal causing the cavity resonant frequency to shift and thereby requires additional tuning devices to be employed.

Accordingly, an object of the present invention is the provision of an electro-optic modulator which provides an increased index of modulation.

Another object is to provide an electro-optic modulator in which the limitation on the maximum optical phase retardation due to crystal length is substantially eliminated.

A further object is to provide an electro-optic modulator wherein the crystal heating is substantially reduced.

In accordance with the present invention, a plurality of electro-optic crystals are aligned so that their individual optic axes define a common optic axis. The crystals are positioned in an electric field having a component substantially parallel to the common optic axis. The electric field is selected to have a constant phase along the common optic axis and induces birefringence in the crystals.

The application of a beam of polarized light having a direction of polarization between the axes of induced birefringence of the crystals results in the light being polarization modulated in accordance with the electric field. The modulation is produced by the optical phase-retardation introduced by each crystal. And, by orienting the successive crystals such that their $a$ and $b$ crystallographic axes are rotated by 90 degrees with respect to each adjacent crystal, the relative optical phase retardation of the plurality of crystals and the modulation produced thereby is found to be cumulative and the transit time limitation inherent in known modulators of this type is essentially eliminated.

The crystals employed in the multicrystal structure may be formed of potassium dihydrogen phosphate (KDP), ammonium dihydrogen phosphate (ADP) or similar material exhibiting a longitudinal electro-optic effect wherein the electro-optic effect is provided by an electric field substantially parallel to the optic axis of the crystal. The length of each individual crystal is chosen so that the transit time of light therethrough is substantially equal to one-half the period of the modulating signal frequency. The preferred length L being determined by the following expression $$L = C/2nf$$

where $c$ is the velocity of light in free space, $f$ is the frequency of the modulating signal and $n$ is the index of refraction in the direction of polarization. For maximum optical phase retardation in each electro-optic crystal, the length of each crystal is selected to be equal to the above-defined L.

The induced birefringence exhibited by electro-optic crystals is characterized by the fact that light traveling therein has different velocities for different directions of polarization. The beam of polarized light applied to the crystals may be resolved into two components, each of which corresponds to one of the axes of induced birefringence termed the slow and fast axes respectively, traveling at different velocities. When the light emerges from the crystal there is a difference in phase between the components determined primarily by the length of the crystal and the different in velocity between the components. If the inducing electric field is reversed in polarity, the velocities intially corresponding to the slow and fast axes are interchanged with the optical phase retardation of the components being reversed. The one-half period crystal length is found to provide the maximum relative optical phase retardation per individual crystal since the portion of the light beam entering the crystal at the start of a half period emerges without experiencing this interchange of the slow and fast axes.

In the multicrystal structure, the $a$ and $b$ crystallographic axes of each succeeding crystal are rotated 90 degrees in either direction about the common optic axis with respect to the axes of each preceding crystal. The rotation utilizes the property of crystals having a longitudinal electro-optic effect that an electric field parallel to the optic axis is equivalent to an electric field of opposite polarity when the $a$ and $b$ crystallographic axes are rotated by 90 degrees in either direction. The alternate rotation of the crystals comprising the multicrystal structure enables a beam of light to enter each crystal at essentially the same point in the following one-half cycle of the modulating signal without the slow and fast axes being interchanged. Thus, the optical phase retardation is cumulative and determined primarily by the number of crystals employed.

The multicrystal structure may be positioned in a microwave cavity with the common optic axis coincident with the cavity axis. The cavity is selected to be resonant at the modulating frequency and in a mode, such as the $TM_{010}$ mode, having no axial variation in electric fields. Thus, the electric field inducing birefringence has a constant phase along the common axis of the multicrystal structure. Alternatively, the constant phase electric field may be applied by two apertured conducting plates positioned at each end of the multicrystal structure. The modulating signal may be either a modulated or unmodulated continuous wave or a series of pulses of the modulating frequency.

The beam of light emerging from the electro-optic modulator is polarization modulated. In addition, if the direction of the plane of polarization of the applied light beam is selected to coincide with one of the axes of induced birefringence, the electro-optic effect produces a phase modulated output which may then be converted into intensity modulated light by using an optical discriminator.

By rotating the direction of the plane of polarization of the light beam so that it makes an angle of 45 degrees with the axes of induced birefringence, the light beam is polarization modulated and when passed through a quarter-wave plate having its slow and fast axes oriented with the induced axes of the crystals and a linear polarizer appears as intensity modulated light modulated at the frequency of the applied field. The quarter-wave plate introduces a 90 degree phase shift between the two components emerging from the multicrystal structure to establish an operating bias. The quarter-wave plate so oriented may be disposed between the light source and the multicrystal structure in which case the input to the multicrystal structure is circularly polarized light. The linear polarizer is in turn rotated 45 degrees with respect to the axes of induced birefringence and thus selects one component of the polarization modulated beam. This component is intensity modulated in accordance with the applied electric field.

For a modulating signal of given power, the optical phase retardation provided by the multicrystal structure increases essentially as $\sqrt{n}$, where $n$ is the number of one-half period crystals in the structure. This is shown by noting that for a given power input when the number of crystals increases, the capacitance of the multicrystal structure decreases accordingly due to the increase in length while the voltage thereacross increases as the square root of the separation. The power input is shown by $$P = 1/2CV^2$$

where C is the capacitance and V is the voltage across the multi-crystal structure. Thus decreasing the capicitance C by a factor of $n$, where $n$ is the number of crystals, increases the voltage by a factor of $\sqrt{n}$. In addition, the use of $n$ crystals decreases the power density correspondingly so that the effects of crystal heating are substantially decreased.

Further features and advantages of the invention will become more readily apparent from the following description of a specific embodiment when viewed in conjunction with the accompanying drawings in which.

Figure 1:
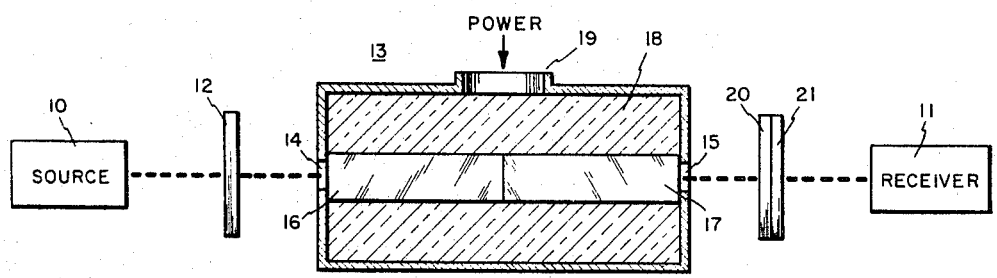
FIG. 1 is a side view in section of one embodiment of the invention.

Referring now to the embodiment of FIG. 1, source 10 is shown directing a beam of light toward a receiver 11. The light beam is polarized by plane polarizer 12, such as a Nicol prism prior to entering resonant cavity 13 through aperture 14. The light source 10 is preferably a monochromatic source such as a sodium vapor lamp or optical maser. It shall be noted that if the light emitted by source 10 is completely polarized in any manner, polarizer 12 may be omitted.

The beam of light enters cavity 13 through aperture 14, passes through electro-optic crystals 16 and 17 and emerges from the cavity through aperture 15. The apertures are located on the axis of cavity 13 and crystals 16 and 17 are positioned therein so that the common optic axis coincides with the cavity axis.

Dielectric blocks are provided in the cavity to maintain crystals 16 and 17 in an aligned position. The cavity is chosen to be resonant at the frequency of the modulating signal and is coupled to a suitable power source, for example a klystron, by opening 19. The cavity operating mode is chosen such that substantially no axial variation in electric field exists. A transverse magnetic $TM_{010}$ mode in a cylindrical cavity or the equivalent is found suitable. When the cavity is energized, the electric field therein is parallel to and exhibits no variation along the cavity axis and the common optic axis of the crystals.

Electro-optic crystals 16 and 17 are formed of a material, such as potassium dihydrogen phosphate (KDP) which exhibits induced birefringence. In the case of KDP and its isomorphs, the axes of induced birefringence in the crystals make an angle of 45 degrees with the *a* and *b* crystallographic axes thereof, seen in FIG. 2, and reside in a plane perpendicular to the optic or *c* crystallographic axis of the crystal. However, other materials exhibiting a longitudinal electro-optic effect may be employed if desired. The induced birefringence is characterized by the fact that the components of the light beam having a direction of polarization parallel to the induced axes have different velocities when traveling through the crystal. In accordance with the difference in velocity, the induced axes are generally referred to as the fast and slow axes respectively. Due to this difference in velocity, the two light components exhibit a relative optical phase retardation therebetween.

For a given applied field, i.e. power input to cavity 13, the optical phase retardation is determined by the velocity difference and the transit time required for the components to travel through the crystal. However, the slow and fast axes of the crystal are found to interchange each one-half period of the modulating electric field. This interchange of axes reduces the optical phase retardation for light entering the crystal at the start of each one-half period.

In order to minimize the reduction in optical phase retardation, the length of crystals 16 and 17 is selected to be such that the transit time of light therethrough is equal to one-half the period of the modulating signal. Thus, light entering either crystal at the beginning of a half-cycle of the modulating signal experiences maximum optical phase retardation therein. Although it is preferred to have the crystal length chosen such that the light transit time therethrough equals one half the period of the modulating electric field, other lengths may be employed for particular applications, if desired.

Figure 2:
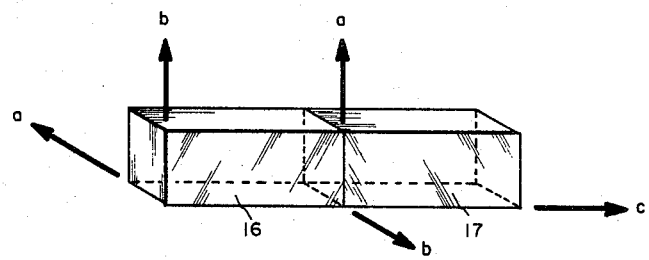
FIG. 2 shows the relative orientation of the crystallographic axes of the crystals shown in FIG. 1.

The orientation of the crystallographic axes of crystals 16 and 17 is such that the total retardation of the multicrystal structure is cumulative. The orientation of the crystallographic axes is shown in FIG. 2 wherein the *a* and *b* axes of crystal 17 are rotated 90 degrees about the *c* axis with respect to the corresponding axes of crystal 16. The direction of rotation is not critical due to the crystal symmetry.

By so rotating crystal 17, light entering crystal 17 finds the slow and fast axes having the same orientation as when that light entered crystal 16. This is due to the fact that rotataion of a longitudinal electro-optical crystal 90 degrees about its optic axis interchanges the slow and fast axes of induced birefringence and coupled with the fact that the direction of the electric field is reversed when the light enters crystal 17, the conditions of crystal 16 are substantially repeated. In the preferred situation wherein each crystal has a length chosen such that the light transmit time therethrough is equal to one-half of the modulating period, the light entering crystal 17 encounters the same conditions as when it entered crystal 16. Thus, the otpical phase retardation is both equal and cumulative. Although only two crystals are employed in the embodiment shown, additional crystals may be used as desired, provided that each succeeding crystal is rotated 90 degrees with respect to its adjacent crystal.

During operation, the beam of polarized light enters cavity 13 through aperture 14 and travels along the optic axis of crystal 16. If the light is plane polarized, the direction of polarization is advantageously oriented at an angle of 45 degrees with respect to the axes of induced birefringence. The light can then be considered to have two substantially equal orthogonal components corresponding to the induced axes. As the components travel through crystal 16, that component traveling along the slow axis experiences a relative optical phase retardation in accordance with the strength of the modulating electric field. When the components enter crystal 17, the components experience essentially the same conditions as they did when entering crystal 16. Thus the phase retardation of crystal 17 is in effect added to the retardation produced by crystal 16.

The light emerging from the multicrystal structure is elliptically polarized light. The relative lengths of the major and minor axes of the ellipse traced by the electric vector of the light are varied in accordance with the modulating electric field and the light is polarization modulated.

The light is then passed through quarter-wave plate 20 which has its axes of birefringence oriented parallel to the axes of induced birefringence of the multicrystal structure. As known, a quater-wave plate introduces a 90 degree phase retardation between components polarized parallel to its axes of birefringence. The introduction of the 90 degree retardation provides an operating bias about the half intensity point of the light beam. The optical phase retardation produced by the multicrystal structure is algebraically added to the 90 degree phase retardation. It will be noted that the quarter-wave plate can be inserted at any point between polarizers 12 and 21.

The light then passes through polarizer 21 which is oriented at 45 degrees with respect to the axes of induced birefringence of crystals 16 and 17. Thus, the polarizer 21 passes a component of the polarization modulated light emerging from the multicrystal structure. This component is intensity modulated light.

If the light emerging from plane polarizer 12 has its direction of polarization substantially aligned with one axis of induced birefringence of the multicrystal structure, the device provides phase modulated light. In this mode of operation, the modulating electric field retards or increases the velocity of the light beam through the multicrystal structure to modulate the phase of the beam. The relative rotation of the crystals results in the modulating effect of the multicrystal structure being cumulative which in turn substantially increases the index of modulation. The output of the multicrystal structure may then be converted to intensity modulated light by using an optical discriminator.

The depth of modulation or variation in intensity of the light beam with respect to intensity of the unmodulated beam is determined by the optical phase retardation provided by the multicrystal structure. The light traveling through the crystals has two components with varying propagation constants. The polarization of the resultant light emerging from the electro-optic crystals is a function of the relative optical phase retardation. The variation of the phase retardation modulates the polarization of the light beam.

To increase the depth of modulation for a given power input to the electro-optic crystals, the optical phase retardation must be increased. In the present modulator, the retardation is found to be a function of the $\sqrt{n}$, where $n$ is the number of crystals employed in the multicrystal structure.

Figure 3:
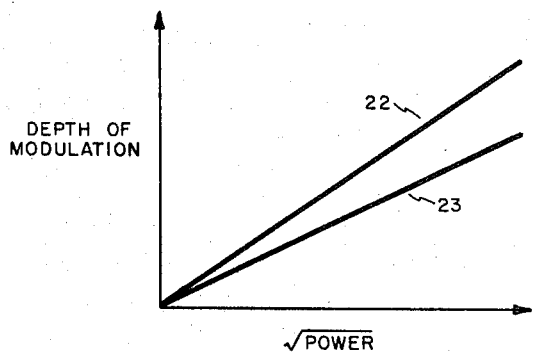
FIG. 3 is a graph showing the improvement in depth of modulation exhibited by the embodiment of FIG. 1.

The improvement in depth of modulation exhibited by the above-described modulator is shown by the graph of FIG. 3, wherein curve 23 indicates the variation in depth of modulation for increasing input powers for single crystal electro-optic modulators and curve 22 shows the corresponding depth of modulation attainable for one embodiment of the present invention using two electro-optic crystals.

In one particular embodiment using two one-half period crystals of KDP each 1.35 inches long and having the above described relative rotation, the maximum depth of modulation was found to be 0.30 for 7.5 watt power input. The modulating signal was 200 microsecond pulses having a duty factor of 0.5 at a frequency of 2926 megacycles per second.

While the above discussion has been in reference to a particular embodiment, it is apparent that many modifications and changes therein may be made without departing from the spirit and scope of the invention.

What is claimed is:
1. Apparatus for modulating a beam of polarized light in accordance with a modulating electric field which comprises:
 (a) a plurality of electro-optic crystals having $a$, $b$, and $c$ crystallographic axes with the $c$ axis defining the optic axis thereof, said crystals exhibiting induced birefringence wherein the slow and fast induced axes are orthogonal, said crystals being aligned to form a multicrystal structure having a common optic axis with the $a$ and $b$ crystallographic axes of each of said crystals being rotated 90 degrees with respect to the corresponding axes of each adjacent crystal, each of said crystals having a length so that the transit time of light therethrough is substantially equal to one-half of the period of the modulating electric field, and
 (b) means for applying the modulating electric field along the common optic axis of said multicrystal structure to induce birefringence therein, the relative rotation of said crystals providing cumulative modulation of the light beam when passed through the multicrystal structure.

2. Apparatus for modulating a beam of polarized light in accordance with a modulating signal which comprises:
 (a) a resonant cavity having an aperture in each end, said cavity being resonant at the frequency of the modulating signal,
 (b) a plurality of electro-optic crystals having $a$, $b$, and $c$ crystallographic axes with the $c$ axis defining the optic axis thereof, said crystals exhibiting induced birefringence wherein the slow and fast induced axes are orthogonal, said crystals being aligned to form a multicrystal structure having a common optic axis with the $a$ and $b$ crystallographic axes of each of said crystals being rotated 90 degrees with respect to the corresponding axes of each adjacent crystal, each of said crystals having a length so that the transit time of light therethrough is substantially equal to one-half of the period of the modulating electric field,
 (c) means positioned in said resonant cavity for supporting said multicrystal structure therein with the common optic axis between said apertures, and
 (d) means for coupling power at the modulating frequency to said cavity, the electric field in said cavity inducing birefringence in said crystals with the relative rotation of said crystals providing cumulative modulation of the light beam when passed through the multicrystal structure.

3. Apparatus for modulating a beam of polarized light in accordance with a modulating signal which comprises:
 (a) a resonant cavity having an aperture in each end, said cavity being resonant at the frequency of the modulating signal in a mode having no axial variation in electrical field,
 (b) a plurality of electro-optic crystals having $a$, $b$, and $c$ crystallographic axes with the $c$ axis defining the optic axis thereof, said crystals exhibiting induced birefringence wherein the slow and fast induced axes are orthogonal, said crystals being aligned to form a multicrystal structure having a common optic axis with the $a$ and $b$ crystallographic axes of each of said crystals being rotated 90 degrees with respect to the corresponding axes of each adjacent crystal, each of said crystals having a length so that the transit time of light therethrough is substantially equal to one-half of the period of the modulating electric field,
 (c) dielectric means positioned in said resonant cavity for supporting said multicrystal structure therein with the common optic axis between said apertures, and
 (d) means for coupling power at the modulating frequency to said cavity, the axial electric field in said cavity inducing birefringence in said crystals with the relative rotation of said crystals providing cumulative modulation of the light beam when passed through the multicrystal structure, the index of said cumulative modulation being a function of the number of said crystals.

4. Apparatus for modulating a beam of polarized light in accordance with a modulating signal which comprises:
 (a) a resonant cavity having an aperture in each end, said cavity being resonant at the frequency of the modulating signal in a mode having no axial variation in electric field,
 (b) a plurality of electro-optic crystals having $a$, $b$, and $c$ crystallographic axes with the $c$ axis defining the optic axis thereof, said crystals exhibiting induced birefringence wherein the slow and fast induced axes are orthogonal, said crystals being aligned to form a multicrystal structure having a common optic axis with the $a$ and $b$ crystallographic axes of each of said crystals being rotated 90 degrees with respect to the corresponding axes of each adjacent crystal, each of sad crystals having a length so that the transit time of light therethrough is equal to one-half of the period of the modulating electric field,
 (c) dielectric means positioned in said resonant cavity for supporting said multicrystal structure threin with the common optic axis between said apertures, and
 (d) means for coupling power at the modulating frequency to said cavity, the axial electric field in said cavity inducing birefringence in said crystals with the relative rotation of said crystals providing cumulative modulation of the light beam when passed through the multicrystal structure, the index of said cumulative modulation being a function of $\sqrt{n}$, where $n$ is the number of said electro-optic crystals.

5. Apparatus for phase modulating a beam of plane polarized light in accordance with a modulating electric field which comprises:
 (a) a plurality of electro-optic crystals having $a$, $b$, and $c$ crystallographic axes with the $c$ axis defining the optic axis thereof, said crystals exhibiting induced birefringence wherein the slow and fast induced axes thereof are orthogonal, said crystals being aligned to form a multicrystal structure having a common optic axis and the $a$ and $b$ crystallographic axes of each said crystals being rotated 90 degrees with respect to the corresponding axes of each adjacent crystal, each of said crystals having a length so that the transit time of light therethrough is substantially equal to one-half of the period of the modulating electric field, said multicrystal structure being oriented so that one of the axes of induced birefringence is aligned with the direction of polarization of said light beam, and
 (b) means for applying the modulating electric field along the common optic axis of said multicrystal structure to vary the velocity of said light beam accordingly, the light beam being phase modulated with the index of modulation being a function of the $\sqrt{n}$, where $n$ is the number of crystals in the multicrystal structure.

6. Apparatus for phase modulating a beam of plane polarized light in accordance with a modulating electric field which comprises:
 (a) a resonant cavity having an aperture in each end, said cavity being resonant at the frequency of the modulating signal in a mode having no axial variation in electric field,
 (b) a plurality of electro-optic crystals having $a$, $b$, and $c$ crystallographic axes with the $c$ axis defining the optic axis thereof, said crystals exhibiting induced birefringence wherein the slow and fast induced axes thereof are orthogonal, said crystals being aligned to form a multicrystal structure having a common optic axis with the *a* and *b* crystallographic axes of each of said crystals being rotated 90 degrees with respect to the corresponding axes of each adjacent crystal, each of said crystals having a length so that the transit time of light therethrough is substantially equal to one-half of the period of the modulating electric field, said multicrystal structure being oriented with respect to the direction of polarization of said light beam so that the light beam is resolved into two components corresponding with the slow and fast axes respectively, (c) dielectric means positioned in said resonant cavity for supporting said multicrystal structure therein with the common optic axis between said apertures, and (d) means for coupling power at the modulating frequency to said cavity, the axial electric field in said cavity varying the velocity of said light beam accordingly, the light beam being phase modulated with the index of modulation being a function of the $\sqrt{n}$, where *n* is the number of crystals in the multicrystal structure.

7. Apparatus for intensity modulating a beam of plane polarized light from a source in accordance with a modulating electric field which comprises:

(a) a plurality of electro-optic crystals having *a*, *b*, and *c* crystallographic axes with the *c* axis defining the optic axis thereof, said crystals exhibiting induced birefringence wherein the slow and fast induced axes thereof are orthogonal, said crystals being aligned to form a multicrystal structure having a common optic axis with the *a* and *b* crystallographic axes of each of said crystals being rotated 90 degrees with respect to the corresponding axes of each adjacent crystal, each of said crystals having a length so that the transit time of light therethrough is substantially equal to one-half of the period of the modulating electric field, said multicrystal structure being oriented with respected to the direction of polarization of said light beam so that the light beam is resolved into two components corresponding with the slow and fast axes respectively, (b) means for applying the modulating electric field along the common optic axis of said multicrystal structure to induce birefringence therein, the relative rotation of said crystals providing cumulative relative optical phase retardation of the components of said light beam whereby said light beam is polarization modulated, (c) a polarizer oriented at 45 degrees with respect to the axes of induced birefringence of said multicrystal structure for passing a component of said polarization modulated light, said polarizer being placed in alignment with the common optic axis of the multicrystal structure, and (d) a quarter-wave plate having the axes of birefringence of said multicrystal structure and placed in alignment with the common optic axes thereof to provide a 90 degree phase retardation between the two components of said light beam, said quarter-wave plate being positioned between the source and the polarizer, the component passed by said polarizer being intensity modulated in accordance with the modulating electric field.

8. Apparatus for intensity modulating a beam of plane polarized light from a source in accordance with a modulating electric field which comprises:

(a) a resonant cavity having an aperture in each end, said cavity being resonant at the frequency of the modulating signal in a mode having no axial variation in electric field, (b) a plurality of electro-optic crystals having *a*, *b*, and *c* crystallographic axes with the *c* axis defining the optic axis thereof, said crystals exhibiting induced birefringence wherein the slow and fast induced axes thereof are orthogonal, said crystals being aligned to form a multicrystal structure having a common optic axis with the *a* and *b* crystallographic axes of each of said crystals being rotated 90 degrees with respect to the corresponding axes of each adjacent crystal, each of said crystals having a length so that the transit time of light therethrough is equal to one-half of the period of the modulating electric field, said multicrystal structure being oriented to make an angle of 45 degrees with respect to the direction of polarization of said light beam so that the light beam is resolved into two components corresponding with the slow and fast axes respectively, (c) dielectric means positioned in said resonant cavity for supporting said multicrystal structure therein with the common optic axis between said apertures, (d) means for coupling power at the modulating frequency to said cavity, the axial electric field in said cavity inducing birefringence in said crystals, the relative rotation of said crystals providing cumulative relative optical phase retardation of the components of said light beam whereby said light is polarization modulated, (e) a polarizer oriented at 45 degrees with respect to the axes of induced birefringence of said multicrystal structure for passing a component of said polarization modulated light, the component so passed being intensity modulated in accordance with the modulating electric field, and (f) a quarter-wave plate having the axes of birefringence thereof parallel to the axes of induced birefringence of said multicrystal structure and placed in alignment with the common optic axis thereof to provide a 90 degree phase retardation between the two components of said light beam, said quarter-wave plate being positioned between the source and the polarizer.

References Cited

UNITED STATES PATENTS

| 2,024,737 | 12/1935 | Klingsporn | 350—150 |
| 2,788,710 | 4/1957 | West | 250—199 |
| 3,292,108 | 12/1966 | Johnson. | |
| 3,304,428 | 2/1967 | Peters | 350—150 |

ROBERT L. GRIFFIN, *Primary Examiner.*

A. J. MAYER, *Assistant Examiner.*

U.S. Cl. X.R.

332—7.51; 350—150